United States Patent Office 3,799,930
Patented Mar. 26, 1974

3,799,930
1,4-DIHYDRO-1-SUBSTITUTED-4-OXO-3-QUINO-
LINECARBOXLIC ACIDS AND ESTERS
Takenari Nakagome, Toyonaka, Hideo Agui, Ikeda, Toru
Mitani, Nishinomiya, Mitsuo Nakashita, Kobe, Toshiaki
Komatsu, Takarazuka, and Akio Izara and Yasuko
Eda, Toyonaka, Japan, assignors to Sumitomo Chemical Co., Ltd., Osaka, Japan
No Drawing. Filed July 9, 1971, Ser. No. 161,265
Claims priority, application Japan, July 9, 1970,
45/60,214, 45/60,216; July 10, 1970, 45/60,776;
Aug. 1, 1970, 45/67,518; Dec. 28, 1970, 46/
129,978, 46/129,979, 46/129,981
Int. Cl. C07d 33/48
U.S. Cl. 260—287 R         5 Claims

ABSTRACT OF THE DISCLOSURE

Novel antibacterial agents comprising a 1,4-dihydro-1-substituted-4-oxo-3-quinolinecarboxylic acid derivative of the formula:

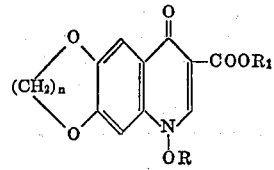

wherein R is a $C_1$–$C_{20}$ alkyl, a $C_2$–$C_6$ alkenyl, a $C_3$–$C_6$ cycloalkyl, a $C_3$–$C_6$ cycloalkyl-$C_1$–$C_3$ alkyl, a hydroxy-$C_1$–$C_6$ alkyl, a $C_1$–$C_4$ alkoxy-$C_1$–$C_3$ alkyl, or an aryl-$C_1$–$C_3$ alkyl; $R_1$ is a hydrogen atom or a $C_1$–$C_6$ alkyl; and $n$ is a figure of 1, 2 or 3, a process for producing the derivatives and pharmaceutical compositions containing the same. The above-identified derivative possesses antibacterial activity against gram-negative bacteria at test concentration levels of about 0.0001 to 1.0 mg./cc.

BACKGROUND OF THE INVENTNON

This invention relates to novel antibacterial agents. More particularly, it pertains to a 1,4-dihydro-1-substituted-4-oxo-3-quinolinecarboxylic acid derivatives, to intermediates useful in their preparation, to a process for preparing said compounds and to therapeutic compositions containing the above compounds which are useful in the treatment of bacterial infections.

SUMMARY OF THE INVENTION

We have found that a novel 1,4-dihydro-1-substituted-4-oxo-3-quinolinecarboxylic acid derivative of the formula,

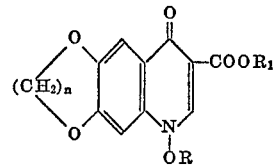

wherein R is a $C_1$–$C_{20}$ alkyl, a $C_2$–$C_6$ alkenyl, a $C_3$–$C_6$ cycloalkyl, a $C_3$–$C_6$ cycloalkyl-$C_1$–$C_3$ alkyl, a hydroxyl-$C_1$–$C_6$ alkyl, a $C_1$–$C_4$ alkoxy-$C_1$–$C_3$ alkyl or an aryl-$C_1$–$C_3$ alkyl; $R_1$ is a hydrogen atom or $C_1$–$C_6$ alkyl; $n$ is a figure of 1, 2 or 3, and the salts thereof, have excellent antibacterial activities.

DESCRIPTION OF THE INVENTION

An object of the present invention is to provide the novel 1,4-dihydro-1-substituted-4-oxo-3-quinolinecarboxylic acid derivative which are useful as antibacterial agents, as well as the pharmaceutically compatible salts thereof.

Another object of the invention is to provide a process for producing such antibacterial agents.

Another object of the invention is to provide novel intermediates for the aforesaid compound.

Still another object of the invention is to provide a pharmaceutical composition.

A further object of the invention is to provide a method for controlling bacteria.

Other objects and advantages of the present invention will be apparent from the following description.

In order to accomplish these objects, the present invention provides the 1,4-dihydro-1-substituted-4-oxo-3-quinolinecarboxylic acid derivative of the Formula I given above.

The present invention further provides a process for producing the 1,4 - dihydro-1-substituted-4-oxo-3-quinolinecarboxylic acid derivative of the Formula I, which comprises (1) reacting a 4-hydroxy-3-quinolinecarboxylic acid derivative of the general formula,

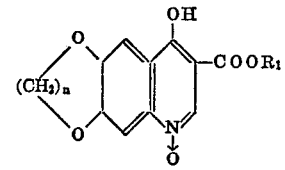

wherein $R_1$ and $n$ are the same as defined with respect to the general Formula I, with an organic ester of a strong acid, and if desired, hydrolyzing the 1,4-dihydro-1-substituted-4-oxo-3-quinolinecarboxylic acid ester obtained, or (2) heating a compound represented by the general formula,

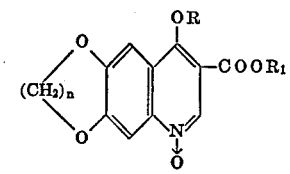

wherein R, $R_1$ and $n$ are the same as defined with respect to Formula I in the presence of an acid catalyst or an organic ester of a strong acid, and if desired, hydrolyzing the 1,4-dihydro-1-substituted-4-oxo-3-quinolinecarboxylic acid ester obtained, or (3) reacting a compound represented by the general formula

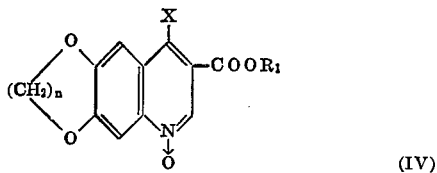

(IV)

wherein $R_1$ and $n$ are the same as defined with respect to Formula I and X is a halogen atom, with an organic ester of a strong acid, and then subjecting the product to hydrolysis reaction.

The 4-hydroxy-3-quinolinecarboxylic acid derivative herein exists in tautomeric forms. Illustrating this tautomerism in the case of Formula II,

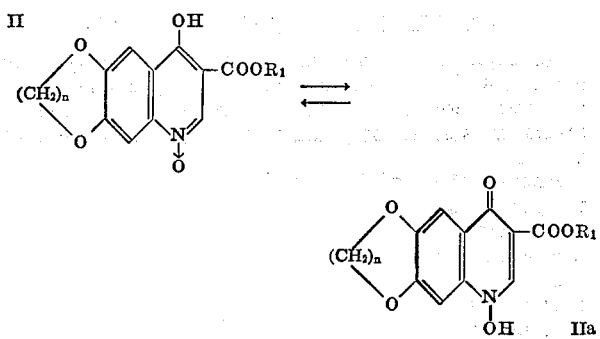

As with all tautomeric systems, the rate of transformation II⇌IIa, and the ratio of II/IIa, are dependent on the thermodynamic environment.

According to a further aspect of the invention, there is provided a pharmaceutical composition consisting of a pharmaceutically effective amount of the 1,4-dihydro-1-substituted-4-oxo-3-quinolinecarboxylic acid derivative of the Formula I given above and a pharmaceutically acceptable carrier or diluent.

According to a still further aspect of the invention, there is provided a method for controlling bacteria, which comprises contacting bacteria with a 1,4-dihydro-1-substituted-4-oxo-3-quinolinecarboxylic acid derivative of the Formula I given above.

In the present invention, the preferred examples of the "alkyl" radical are radicals of not more than 4 carbon atoms, for example, methyl, ethyl, n-propyl, n-butyl, iso-propyl or secondary butyl radicals. The preferred examples of the "alkenyl" radical are vinyl, allyl and butenyl radicals. The preferred examples of the "cycloalkyl" radical are cyclopropyl, cyclobutyl, cyclopentyl and cyclohexyl radicals. The preferred examples of "cycloalkylalkyl" radical are cyclopropylmethyl, cyclobutylmethyl and cyclopentylmethyl radicals. The preferred examples of the "hydroxyalkyl" radical are hydroxymethyl, hydroxyethyl, hydroxypropyl and hydroxybutyl radicals.

The preferred examples of the "alkoxyalkyl" radical are methoxymethyl, methoxyethyl, ethoxymethyl, ethoxyethyl and ethoxypropyl radicals.

The preferred examples of the "arylalkyl" radical are benzyl and phenethyl radicals.

The preferred examples of the "halogen" atom are chlorine and bromine atoms.

The preferred examples of the "alkylthio" radical include methylthio, ethylthio, n-propylthio, iso-propylthio, n-butylthio and benzylthio radicals.

According to the process of the invention, a novel 1,4-dihydro-1-substituted-4-oxo-3-quinolinecarboxylic acid derivative of the Formula II is reacted with an organic ester of a strong acid, i.e., an acid which is practically completely dissociated in aqueous solution, a 1,4-dihydro-1-substituted-4-oxo-3-quinolinecarboxylic acid derivative of the Formula I being obtained.

The organic esters used herein are represented by the formula, $$RY \qquad (V)$$

wherein R is the same as defined with respect to Formula I, Y is an anion portion of a strong inorganic acid or an organic sulfonic acid, e.g., chloride, bromide, iodide, sulfate, benzenesulfonate, paratoluenesulfonate, diethyloxonium fluoroborate and the like. The chloride, bromide, iodide or sulfate is preferred because of the more ready availability. The reaction is carried out preferably in the presence of an acid-acceptor.

The acid-acceptor is a basic substance which preferably forms freely water-soluble byproducts easily separable from the product of the reaction, including for example, sodium hydroxide, potassium hydroxide, sodium carbonate, potassium carbonate, sodium alkoxides, potassium alkoxides, sodium amide, sodium hydride and the like. The purpose of the acid-acceptor is to take up the acid (HX) which is split out during the course of the reaction. The reaction can be carried out either in the presence or absence of a suitable solvent, but preferably in a solvent such as water, a lower-alkanol, acetone, dioxane, dimethylformamide, or a mixture thereof (e.g., a mixture of water and a lower alkanol).

The reaction is generally carried out at a temperature below 150° C. and may be controlled by cooling or heating.

The 1,4-dihydro-1-substituted-4-oxo-3-quinolinecarboxylic acid ester of the Formula I wherein $R_1$ is an alkyl radical is, if desired, hydrolyzed to yield a corresponding free acid, that is, 1,4-dihydro-1-substituted-4-oxo-3-quinolinecarboxylic acid of the general Formula I wherein $R_1$ is a hydrogen atom. The hydrolysis in the present invention is conducted in accordance with the conventional procedure usually employed in the hydrolysis of ester compounds. In the present invention, the ester compound is reacted with water, and the hydrolysis is preferably carried out in the presence of an acidic compound such as inorganic acids (e.g., hydrochloride acid, or sulfuric acid, etc.) or an alkaline compound such as alkali metal hydroxides, etc. When the reaction of a 4-hydroxy-3-quinolinecarboxylic acid ester of the Formula II wherein $R_1$ is an alkyl radical with an ester of the Formula V is carried out in refluxing aqueous solvent in the presence of potassium or sodium hydroxide, the corresponding quinoline-3-carboxylic acid is also obtained together with the 1,4-dihydro-1-substituted-4-oxo-3-quinolinecarboxylic acid ester. If the final product is desired in ester form, e.g., the ethyl ester, the intermediate ethyl 1,4-dihydro-1-hydroxy-4-oxo-3-quinolinecarboxylate is reacted as above in the form of salt, e.g., sodium or potassium salt, using non-aqueous solvent. The hydrolysis may, of course, be carried out after or even without isolation of the 1,4-dihydro-1-substituted-4-oxo-3-quinolinecarboxylic acid ester.

In another process aspect of the invention, a compound of the general Formula III is heated in the presence or absence of an acid catalyst or an organic ester of a strong acid, or the product is further hydrolyzed if desired, whereby the 1,4-dihydro-1-substituted-4-oxo-3-quinolinecarboxylic acid derivative of the Formula I is obtained.

For rearrangement, the starting material may simply be melted upon heating but a solvent inert to the reaction, such as toluene, benzene, xylene, diphenyl, diphenyl ether, a mineral oil, a petroleum hydrocarbon, an alcohol, dioxane, dimethyl formamide, a halogenated hydrocarbon or a mixture thereof may be used. The reaction is conducted at a temperature of from 50° C. to 300° C., and preferably from 100° C. to 250° C. The reaction may proceed by heating either in the absence of a solvent or the presence of a solvent, but when the reaction is conducted in the presence of an organic ester represented by the Formula V such as an alkyl halide, an alkenyl halide, a cycloalkyl halide, a cycloalkylalkyl halide, a hydroxyalkyl halide, an aralkyl halide, an alkoxylalkyl halide, a dialkyl sulfate, an alkyl p-toluenesulfonate, or triethyloxonium fluoroborate or in the presence of an acid catalyst, the reaction is remarkably promoted and the objective compound can be obtained in high yields, even under mild conditions.

As the acid catalyst used in the above reaction, there are included an inorgnic acid such as hydrogen halide, an organic acid such as p-toluenesulfonic acid or acetic acid, and a Lewis acid such as aluminium chloride or boron trifluoride. When the aforesaid materials promoting the reaction are used, the reaction is effected at a temperature from 20° C. to 250° C., and preferably from 20° C. to 150° C.

Then, among the objective compound of present invention, the compound represented by the general Formula I wherein $R_1$ is a hydrogen atom is prepared also from the compound having the general Formula I wherein $R_1$ is a lower alkyl radical by subjecting to hydrolysis. Hydrolysis of the 1,4-dihydro - 1 - substituted-4-oxo-3-quinolinecarboxylic acid ester herein obtained is already mentioned in the present specification.

In the still another process aspect of the invention, a compound of the general Formula IV is allowed to react with an organic ester of the general Formula V and then the product is hydrolyzed to yield the 1,4-dihydro-1-substituted - 4 - oxo - 3 - quinolinecarboxylic acid derivative of the Formula I. In the firt step of the reaction an equimolar amount of a compound of the Formula IV and an organic ester of the Formula V are mixed either in the presence or absence of a solvent. However, the presence of an excess amount of an organic ester does not prevent the progress of the reaction. Such solvents as water, a lower alkanol, dioxane, acetone, benzene, toluene, dimethyl formamide, chloroform or a mixture thereof may be used. The reaction is generally carried out at a temperature below 150° C., and may be controlled by cooling or heating. The product of the reaction which is represented by the general formula,

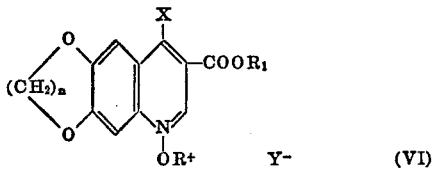

(VI)

wherein R, $R_1$, X, Y and $n$ are the same meanings as stated in the Formulas I, IV and V, is subjected to hydrolysis in the same manner as for the hydrolysis of a 1,4-dihydro-1-substituted - 4 - oxo - 3 - quinolinecarboxylic acid ester of the Formula I wherein $R_1$ is an alkyl radical. In the hydrolysis which converts the radical X to OH, the hydrolysis of the ester group may take place with the concomitant formation of the 1,4 - dihydro - 1 - substituted-4 - oxo - 3 - quinolinecarboxylic ester of the Formula I wherein $R_1$ is an alkyl radical, and the corresponding acid of the Formula I wherein $R_1$ is a hydrogen atom. The hydrolysis may, of course, be carried out after or even without isolation of the compound of the Formula VI.

The novel 4-subsituted quinoline 1-oxide derivatives of the general formula,

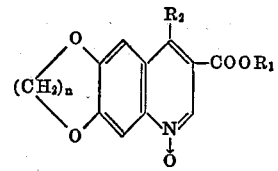

(VII)

wherein $R_1$ and $n$ are the same as defined with respect to Formula I; $R_2$ is a halogen atom; a hyrdoxy, a $C_1-C_6$ alkylthio or an alkoxy radical represented by RO wherein R is the same as in the Formula I may be used as the starting material and are produced by various methods depending upon the choice of the group $R_2$ in the Formula VII.

The compound represented by the general Formula VII, wherein $R_2$ is a hydroxy group, may be obtained by subjecting a compound of the general formula VII wherein $R_2$ is a halogen atom, a $C_1-C_6$ alkylthio or an alkoxy radical represented by RO wherein R is the same as in the Formula I to hydrolysis. In the hydrolysis any conventional means may be employed. The hydrolysis may proceed in the presence of water using or without using an acid or an alkaline material. The solvent used in the reaction may be water or a solvent which is miscible with water, such as an alcohol or dioxane. In the hydrolysis it may occur that the hydrolysis of the ester group is involved, whereby the 4-hydroxy-3-quinolinecarboxylic acid of the Formula II wherein $R_1$ is a hydrogen atom is obtained.

The compound of the general formula VII, wherein $R_2$ is a $C_1-C_6$ alkylthio or an alkoxy radical represented by RO wherein R is the same as in the Formula I can be prepared by the reaction of a compound of the general Formula IV in which $R_1$ is an alkyl group, with an alcohol represented by the general formula, ROH, or a mercaptan represented by the general formula, $R_3SH$, wherein R represents the same meanings as defined with respect to the Formula I and $R_3$ is a $C_1-C_6$ alkyl radical, or further hydrolyzing the product. In this case, it is better to conduct the reaction in the presence of an acid-acceptor.

Suitable acid-acceptors used in this reaction are inorganic or organic basic materials, such as an alkali metal hydroxide, an alkali metal carbonate, an alakli metal bicarbonate, a metal salt of an alcohol or a mercaptan represented by the formula, ROH or $R_3SH$, respectively. Pyridine can also be used.

However, the use of the metal salt of an alcohol or a mercaptan is most preferable. Moreover, in order that the reaction proceeds smoothyl, a solvent may be employed. Illustrative of such solvents are solvents which are inert to the reaction, such as benzene, toluene, petroleum benzin, and ether and further the alcohol or the mercaptan represented by the above-mentioned general formula, ROH or $R_3SH$, respectively, may be used. When a large amount of such an alcohol or a mercaptan is used, sometimes an ester-exchange reaction of the alkoxy-carbonyl group at the 3-position occurs and results in the formation of the 4-alkyloxy ester or the 4-alkylthio ester having the general Formula VII in which $R_2$ contains the same alkyl group as $R_1$.

The reaction of the present invention proceeds even at low temperatures but may be conducted by heating the system to temperatures of lower than 200° C.

Then, the compound of the general Formula VII wherein $R_1$ is an alkyl radical; $R_2$ is a halogen atom or a $C_1$–$C_4$ alkoxy radical may be obtained by reacting a compound of the general formula,

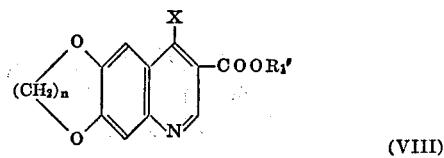

(VIII)

wherein $R_1'$ is a $C_1$–$C_6$ alkyl group; X and $n$ are the same as defined with respect to the Formula IV, or a compound of the general formula,

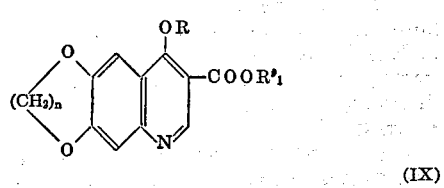

(IX)

wherein $R_1'$ is a $C_1$–$C_6$ alkyl group; R and $n$ are the same as defined with respect to the Formula III, with a peroxide.

The examples of the peroxide include a peracid, e.g. performic acid, peracetic acid, a halogenated peracetic acid such as pertrifluoroacetic acid, perpropionic acid, perlactic acid, monopermaleic acid, monopersuccinic acid, perbenzoic acid, a substituted perbenzoic acid such as monoperphthalic acid and 3-chloroperbenzoic acid, diperphthalic acid, percamphoric acid and hydrogen peroxide or a mixture thereof. Among these peroxides, performic acid, peracetic acid, monopermaleic acid, perbenzoic acid, monoperphthalic acid, 3-chloroperbenzoic acid and hydrogen peroxide are particularly preferable. The reaction may proceed smoothly at a temperature between —50° C. and 150° C.

Generally the reaction is conducted at room temperature or under cooling. As solvent there can be used an excess of the parent acid or anhydride of the peracid (e.g. acetic acid with peracetic acid), or any unreactive solvent, (e.g. water, an ether, benzene, a halogenated hydrocarbon such as chloroform, dichloroethane and chlorobenzene). The peroxide is used in an amount of one or more molecular equivalents to a compound of the Formulas VIII and IX but the use of a large amount of the peroxide does not prevent the progress of the reaction.

As previously stated, the 1,4-dihydro-1-substituted-4-oxo-3-quinolinecarboxylic acid derivatives represented by the Formula I above are novel and useful compounds which have remarkably strong antibacterial activities, e.g., when tested according to standard in vitro bacteriological evaluation procedures, they have been found to possess antibacterial activity, for example, against gram-negative bacteria, e.g., *Escherichiae coli* and *Proteus mirabilis*, at test concentration levels in the range of about 0.0001 to 1.0 mg./cc.

The invention will be described in further detail by the following examples which are given for illustrative purposes and not intended to limit the invention.

EXAMPLE 1

4-ethoxy - 3 - ethoxycarbonyl - 6,7 - methylenedioxyquinoline (4.33 g.) was dissolved in 150 cc. of chloroform containing 2.3 g. of peroxybenzoic acid. The solution was kept at 5°–10° C. for 5 days. At the end of the reaction the solvent was removed by distillation under reduced pressure. Aqueous sodium carbonate was added to the residue. The white solid was filtered, washed with water and dried to give 8.87 g. (97%) of 4-ethoxy-3-ethoxy- carbonyl-6,7-methylenedioxyquinoline 1-oxide. Recrystallization from ethyl acetate gave colorless needles having a melting point of 148°–149° C.

The elementary analysis values for $C_{15}H_{15}O_6N$ were as follows:

Calculated, percent: C, 59.01; H, 4.95; N, 4.59. Found, percent: C, 59.09; H, 4.86; N, 4.51.

EXAMPLE 2

4 - chloro-3-ethoxycarbonyl - 6, 7 - methylenedioxyquinoline (14 g.) was dissolved in 7.8 g. of chloroform solution containing peroxybenzoic acid (9%, w./w.). The solution was kept at room temperature for 5 days. At the end of the reaction, the solvent was removed by distillation under reduced pressure. To the residue was added aqueous sodium carbonate. The white solid was filtered, washed with water and recrystallized from ethyl acetate-chloroform to give 11.5 g. (78%) of 4-chloro-3-ethoxycarbonyl - 6,7 - methylenedioxyquinoline 1-oxide as pale yellow plates, M.P. 189°–190° C.

The elementary analysis values for $C_{13}H_{10}O_5NCl$ were as follows:

Calculated, percent: C, 52.80; H, 3.41; N, 4.74; Cl, 12.00. Found, percent: C, 52.89; H, 3.36; N, 4.76; Cl, 11.94.

EXAMPLE 3

4-chloro - 3 - ethoxycarbonyl-6,7-methylenedioxyquinoline 1-oxide (7.4 g.) was added to 100 cc. of methanol containing 0.69 g. of sodium. The solution was refluxed for 5 hours. After the reaction was completed, the methanol was removed by distillation under reduced pressure. To the solution was added 20 cc. of water. The yellow solid was filtered, washed with water and rerystallized from methanol to give 3-ethoxycarbonyl-4-methoxy-6,7-methylenedioxyquinoline 1-oxide as pale yellow prisms, M.P. 203°–204° C.

The elementary analysis values for $C_{13}H_{11}O_6N$ were as follows:

Calculated, percent: C, 56.32; H, 4.60; N, 5.05. Found, percent: C, 56.13; H, 4.18; N, 5.02.

EXAMPLE 4

4-chloro - 3 - ethoxycarbonyl-6,7-methylenedioxyquinoline 1-oxide (7.4 g.) was added to 100 cc. of ethanol containing 0.69 g. of sodium. The solution was refluxed for 5 hours. After the reaction was completed, the solvent was removed by distillation under reduced pressure. To the residue was added 20 cc. of water. The insoluble solid was filtered, washed with water and recrystallized from ethyl acetate-n-hexane to give pure 3-ethoxycarbonyl-4-ethoxy-6,7-methylenedioxyquinoline 1-oxide.

EXAMPLE 5

4-chloro-3-ethoxycarbonyl-6,7-methylenedioxy 1-oxide (7.4 g.) was added to a suspension of 1 g. of sodium methoxide in 100 cc. of toluene. The mixture was stirred at 80°–90° C. for 8 hours. After the reaction was completed, the toluene was removed by distillation under reduced pressure. The residual solid was washed with water, collected by filtration, washed with water and dried. Recrystallization from methanol afforded 3-ethoxycarbonyl - 4 - methoxy-6,7-methylenedioxyquinoline 1-oxide.

EXAMPLE 6

A mixture containing 50 cc. of anhydrous benzene, 3.1 g. of ethylmercaptane and 0.58 g. of sodium was refluxed for 12 hours. Then 4-chloro-3-ethoxycarbonyl-6,7-methylenedioxyquinoline 1-oxide (5.95 g.) was added. The mixture was refluxed for further 4 hours. After the reaction was completed the volatile material was removed by distillation under reduced pressure. To the residue was added water. The precipitate was collected by filtration, washed with water, dried and recrystallized from ethanol to give 3-ethoxycarbonyl-4-ethylmercapto-6,7-methylenedioxyquinoline 1-oxide as colorless scales having a melting point of 119–121° C.

The elementary analysis values for $C_{15}H_{15}O_5NS$ were as follows:

Calculated, percent: C, 56.07; H, 4.71; N, 4.36. Found, percent: C, 55.60; H, 4.46; N, 4.06.

EXAMPLE 7

A mixture containing 28.5 g. of sodium hydroxide, 50 cc. of water, 270 cc. of methanol and 50 g. of 3-ethoxycarbonyl-4-ethoxy-6,7-methylenedioxyquinoline 1 - oxide was stirred under reflux for 2 hours. Then water (320 cc.) was added. The mixture was stirred under reflux for 8 hours further. At the end of the reaction, the solution was treated with concentrated hydrochloric acid to adjust the pH to 1.0. The precipitate was filtered, washed with water and recrystallized from dimethylformamide to give 41 g. (97.6%) of 4-hydroxy-6,7-methylenedioxy-3-quinolinecarboxylic acid 1-oxide as colorless needles, M.P. 302°C. (decomposition).

The elementary analysis values for $C_{11}H_7O_6N$ were as follows:

Calculated, percent: C, 53.02; H, 2.83; N, 5.62. Found, percent: C, 52.83; H, 2.95; N, 5.73.

EXAMPLES 8–10

The procedure of Example 6 was repeated except using the conditions indicated in Table I to give 4-hydroxy-6,7-methylene-dioxy-3-quinolinecarboxylic acid 1-oxide, as shown schematically below

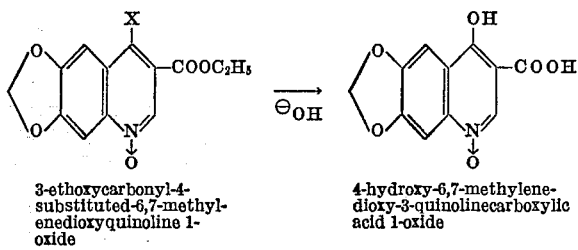

3-ethoxycarbonyl-4-substituted-6,7-methyl-enedioxyquinoline 1-oxide 4-hydroxy-6,7-methylene-dioxy-3-quinolinecarboxylic acid 1-oxide

TABLE I

| X | Reaction Time, hours | Temp. | Yield, percent |
| --- | --- | --- | --- |
| Example number: | | | |
| 8 ......... OMe | 8 | Reflux | 99 |
| 9 ......... Cl | 15 | ...do... | 98 |
| 10 ........ SEt | 15 | ...do... | 90 |

EXAMPLE 11

A mixture containing 7.4 g. of 4-chloro-3-ethoxycarbonyl-6,7-methylenedioxyquinoline 1-oxide, 2.05 g. of sodium acetate and 100 cc. of acetic acid was stirred under reflux for 15 hours. After the reaction was completed, the acetic acid was removed by distillation under reduced pressure. To the residue was added 100 cc. of water. The insoluble brown solid was filtered, washed with water and dissolved in 20% aqueous potassium carbonate solution under cooling. The alkaline solution was filtered and treated with 6 N-hydrochloric acid to adjust pH to 2.0 under cooling. The yellow precipitate was filtered, washed with water and dried to give 2.85 g. (50%) of 4-hydroxy-3-ethoxycarbonyl - 6,7 - methylenedioxyquinoline 1-oxide having a melting point of 180°–182° C.

The elementary analysis values for $C_{13}H_{11}O_6N$ were as follows:

Calculated (percent): C, 56.36; H, 4.00; N, 5.06. Found (percent): C, 55.94; H, 3.94; N, 4.98.

EXAMPLE 12

A mixture containing 2.96 g. of 4-chloro-3-ethoxycarbonyl-6,7-methylenedioxyquinoline 1-oxide and 26 g. of benzyl bromide was stirred at 95°–105° C. for 1 hour. After the reaction was completed, anhydrous ether (50 cc.) was added. The precipitate of 1-benzyloxy-4-chloro-3-ethoxycarbonyl - 6,7 - methylenedioxyquinolinium bromine was collected by filtration, then suspended in 40 cc. of 1 N-hydrochloric acid and the mixture stirred at 90–100° C. for 2 hours. The white solid was filtered, washed with water and recrystallized from dimethylformamide to give 1 - benzyloxy-1,4-dihydro-6,7-methylenedioxy-4-oxo-3-quinoline-carboxylic acid as colorless needles having a melting point of 303–304° C. (decomposition).

The elementary analysis values for $C_{18}H_{13}O_6N$ were as follows:

Calculated (percent): C, 63.72; H, 3.86; N, 4.13. Found (percent): C, 64.05; H, 3.78; N, 4.20.

EXAMPLE 13

A mixture containing 2.95 g. of 4-chloro-3-ethoxycarbonyl-6,7-methylenedioxyquinoline 1-oxide and 30 cc. of ethyl iodide was refluxed for 3 hours. After the reaction was completed, excess ethyl iodide was removed by distillation under reduced pressure.

To the residue was added 50 cc. of 1 N-hydrochloric acid. The suspension was stirred at 95°–100° C. for 2 hours and filtered. The product was recrystallized from dimethylformamide to give 1-ethoxy-1,4-dihydro-6,7-methylenedioxy - 4 - oxo - 3 - quinolinecarboxylic acid as colorless needless having a melting point of 258°–259° C. (decomposition).

The elementary analysis values for $C_{13}H_{11}O_6N$ were as follows:

Calculated (percent): C, 56.32; H, 4.00; N, 5.05. Found (percent): C, 56.08; H, 3.87; N, 4.91.

EXAMPLE 14

A mixture containing 3.05 g. of 4-ethoxy-3-ethoxycarbonyl-6,7-methylenedioxyquinoline 1-oxide and 30 cc. of ethyl iodide was stirred at 70°–75° C. for 4 hours. Excess ethyl iodide was removed by distillation under reduced pressure. The residue was washed with ethyl acetate, filtered and recrystallized from ethyl acetate to give 2.7 g. (89%) of ethyl 1-ethoxy-1,4-dihydro-6,7-methylenedioxy - 4 - oxo - 3 - quinoline carboxylate as colorless prisms having a melting point of 130°–131° C.

The elementary analysis values for $C_{15}H_{15}O_6N$ were as follows:

Calculated (percent): C, 59.01; H, 4.95; N, 4.59. Found (percent): C, 59.19; H, 4.92; N, 4.32.

EXAMPLES 15–18

The procedure of Example 13 was repeated except using the conditions illustrated in Table 2 to give ethyl 1,4-dihydro-1-substituted - 6,7 - methylenedioxy-4-oxo-3-quinolinecarboxylate derivative as shown schematically below

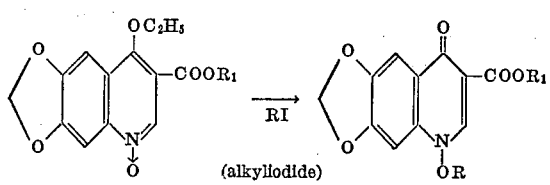

3-alkoxycarbonyl-4-ethoxy-6,7-methylene-dioxyquinoline 1-oxide derivative alkyl 1,4-dihydro-1-substituted-6,7-methylenedioxy-4-oxo-3-quinoline carboxylate derivative

TABLE 2

| Ex. No. | R | R₁ | Reaction temperature and time | Yield, percent | Physical properties | | Elementary analysis Percent | | |
|---|---|---|---|---|---|---|---|---|---|
| | | | | | | | C | H | N |
| 15 | $CH_3$ | $C_2H_5$ | Reflux 1 hr | 95 | Colorless prisms, M.P. 183.5°–185° C | For $C_{14}H_{13}O_6N$ Calculated | 57.73 | 4.50 | 4.82 |
| | | | | | | Found | 57.91 | 4.47 | 4.66 |
| 16 | $CH_2$—$CH$=$CH_2$ | $C_2H_5$ | 90° C., 40 mins | 90 | Colorless prisms, M.P. 140°–141° C | For $C_{16}H_{15}O_6N$ Calculated | 60.56 | 4.77 | 4.41 |
| | | | | | | Found | 60.83 | 4.53 | 4.40 |
| 17 | $CH\diagup^{Me}_{\diagdown Me}$ | $C_2H_5$ | 85° C., 5 hrs | 44 | Colorless prisms, M.P. 148°–149° C | For $C_{16}H_{17}O_6N$ Calculated | 60.18 | 5.37 | 4.37 |
| | | | | | | Found | 60.01 | 5.28 | 4.41 |
| 18 | $CH_3$ | $CH_3$ | 50° C., 5 hrs | 90 | Colorless prisms, M.P. 223°–224° C | For $C_{13}H_{11}O_6N$ Calculated | 56.32 | 4.00 | 5.05 |
| | | | | | | Found | 56.34 | 3.93 | 5.70 |

EXAMPLE 19

A mixture containing 2.77 g. of 4-hydroxy-3-ethoxycarbonyl-6,7-methylenedioxyquinoline 1-oxide, 50 cc. of dimethylformamide and 0.48 g. of sodium hydride having a purity of 50% was stirred at 70°–90° C. for 30 minutes. Then a mixture containing 25 cc. of dimethylformamide and 4.0 g. of diethylsulfate was added at the same temperature. The resulting mixture was stirred at 70°–90° C. for 16 hours further. After the reaction was completed, the solvent was removed by distillation under reduced pressure to give yellow solid.

Recrystallization from ethyl acetate gave ethyl 1,4-dihydro - 1-ethoxy-6,7-methylenedioxy-4-oxo-quinoline carboxylate as colorless prisms having a melting point of 130°–131° C.

EXAMPLES 20–23

The procedure of Example 17 was repeated except using conditions illustrated in Table 3 to give ethyl 1,4-dihydro-1-substituted-6,7-methylenedioxy - 4 - oxo - 3 - quinolinecarboxylate derivative as shown schematically below

EXAMPLE 24

A mixture containing 2.77 g. of 4-hydroxy-3-ethoxycarbonyl-6,7-methylenedioxyquinoline-1-oxide, 30 cc. of 10% aqueous sodium hydroxide and 8.0 g. of diethylsulfate was stirred at 20°–40° C. for 4 hours and at 80°–90° C. for further 5 hours.

After the reaction was completed, the solution was treated with activated carbon and filtered. The filtrate was treated with concentrated hydrochloric acid to adjust pH to 1.

The white precipitate was filtered, washed with water and recrystallized from dimethylformamide to give ethyl 1,4-dihydro-1-ethoxy-6,7 - methylenedioxy - 4 - oxo - 3 - quinolinecarboxylate.

EXAMPLES 25–29

The procedure of Example 22 was repeated except using conditions illustrated in Table 4 to give 1,4-dihydro-1-substituted-6,7-methylenedioxy-4-oxo-3 - quinolinecarboxylic acid derivative as shown schematically below

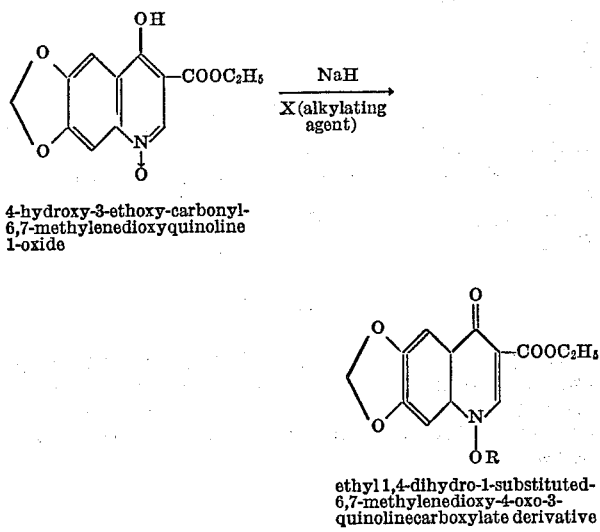

4-hydroxy-3-ethoxy-carbonyl-6,7-methylenedioxyquinoline 1-oxide ethyl 1,4-dihydro-1-substituted-6,7-methylenedioxy-4-oxo-3-quinolinecarboxylate derivative

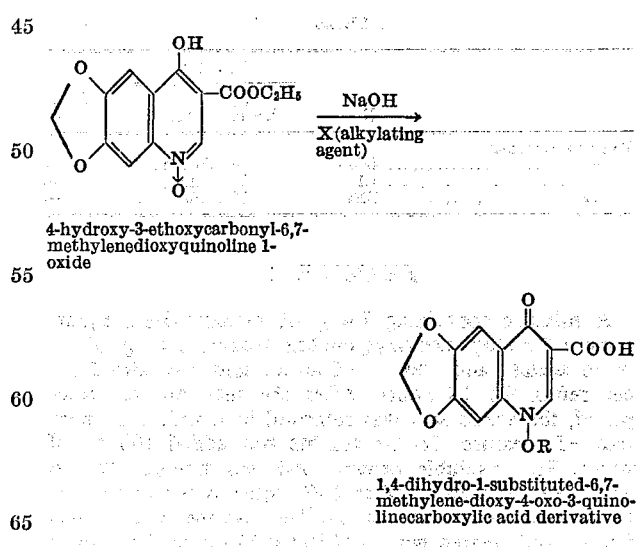

4-hydroxy-3-ethoxycarbonyl-6,7-methylenedioxyquinoline 1-oxide 1,4-dihydro-1-substituted-6,7-methylene-dioxy-4-oxo-3-quinolinecarboxylic acid derivative

TABLE 3

| | X (alkylating agent) | Reaction time and temperature | R |
|---|---|---|---|
| Example number: | | | |
| 20 | $C_2H_5I$ | 70–90° C. 8.5 hours | $C_2H_5$ |
| 21 | $(CH_3O)_2SO_2$ | 70–90° C. 10.5 hours | $CH_3$ |
| 22 | $CH_2$=$CH$-$CH_2Br$ | 70–90° C. 8.5 hours | $CH_2$=$CH$—$CH_2$ |
| 23 | $(CH_3)_2CHI$ | 70–90° C. do | $CH(CH_3)_2$ |

TABLE 4

| Example number | Solvent | Base | X (alkylating agent) | Reaction temperature and time | R | Physical properties | Elementary analysis Percent | | |
|---|---|---|---|---|---|---|---|---|---|
| | | | | | | | | C | H | N |
| 25 | Dimethyl formamide | Sodium hydroxide | $C_2H_5I$ | 70–90° C., 6 hours | $C_2H_5$ | | For $C_{12}H_{11}O_6N$ Calculated...... 54.76 3.45 5.32 Found...... 54.95 3.34 5.39 | | | |
| 26 | Water | 10% aqueous sodium hydroxide | $(CH_3O)_2SO_2$ | 80–90° C., 9 hours | $CH_3$ | Colorless prisms, M.P. 284° C. (decomp.) | | | |
| 27 | Dimethyl formamide | Sodium hydroxide | —$CH_2Br$ (benzyl) | 70–90° C., 6 hours | —$CH_2$—(phenyl) | | For $C_{18}H_{13}O_6N$ Calculated...... 58.13 3.83 4.84 Found...... 58.20 3.74 4.95 | | | |
| 28 | do | do | $CH_2=CH$–$CH_2Br$ | do | $CH_2=CH$–$CH_2$ | Colorless prisms, M.P. 309°–310° C. (decomp.) | | | |
| 29 | do | do | $(CH_3)_2CHI$ | do | $(CH_3)_2CH$ | Colorless prisms, M.P. 185°–186° C. | For $C_{14}H_{13}O_6N$ Calculated...... 57.73 4.50 4.82 Found...... 57.80 4.41 4.90 | | | |

EXAMPLE 30

A mixture containing 0.5 g. of 4-hydroxy-3-ethoxycarbonyl-6,7 - methylenedioxyquinoline 1 - oxide, 2.0 cc. of 10% aqueous sodium hydroxide, 10 g. of methyliodide and 15 cc. of methanol was refluxed for 12 hours. After the reaction was completed, the volatile material was removed by distillation under reduced pressure. The resulting aqueous solution was acidified by the addition of concentrated hydrochloric acid. The white precipitate was filtered, washed with water and recrystallized from dimethylformamide to give 1,4-dihydro-1-methoxy-6,7-methylenedioxy-4-oxo - 3 - quinolinecarboxylic acid in quantitative yield.

EXAMPLE 31–34

The procedure of Example 28 was repeated except using conditions illustrated in Table 5 to give 1,4-dihydro-1-substituted-6,7-methylenedioxy-4 - oxo - 3 - quinolinecarboxylic acid derivative as shown schematically below

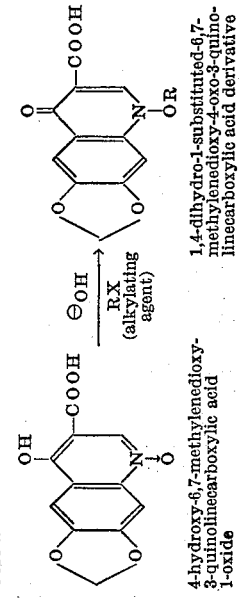

4-hydroxy-6,7-methylenedioxy-3-quinolinecarboxylic acid 1-oxide $\xrightarrow{\text{RX (alkylating agent)}}$ 1,4-dihydro-1-substituted-6,7-methylenedioxy-4-oxo-3-quinolinecarboxylic acid derivative

TABLE 5

| Ex. No. | RX (alkylating agent) | Reaction temperature and time | R | Yield, percent | Physical properties | Elementary analysis Percent | | |
|---|---|---|---|---|---|---|---|---|---|
| | | | | | | C | H | N |
| 31 | —$CH_2Br$ (benzyl) | Reflux 3 hours | —$CH_2$—(phenyl) | 61 | | For $C_{18}H_{13}O_6N$ | | |
| 32 | $CH_2$–$CH_2$ with Br and OH | do | $CH_2CH_2OH$ | 89 | Colorless prisms, M.P. 245°–246° C. (decomp.) | Calculated...... 53.29 3.78 4.78 Found...... 53.44 3.79 4.72 | | |
| 33 | $CH_3CH_2CH_2I$ | Reflux 1 hour | $CH_2CH_2CH_3$ | 74 | Colorless prisms, M.P. 209°–210° C. | For $C_{14}H_{13}O_6N$ Calculated...... 59.40 4.32 5.02 Found...... 59.85 4.19 4.97 | | |
| 34 | $BrCH_2$–cyclopropyl | Reflux 3 hours | $CH_2$–cyclopropyl | 51 | Colorless prisms, M.P. 205°–210° C. | For $C_{15}H_{13}O_6N$ Calculated...... 59.40 4.32 5.02 Found...... 59.85 4.19 4.97 | | |

EXAMPLE 35

A mixture containing 1.7 g. of ethyl 1,4-dihydro-1-ethoxy-6,7-methylenedioxy-4-oxo-3-quinoline carboxylate and 40 cc. of N-hydrochloric acid was refluxed for 1 hour. The separated colorless prisms were filtered, washed with water and recrystallized from dimethylformamide to give 1.46 g. (94%) of 1,4-dihydro-1-ethoxy-6,7-methylenedioxy-4-oxo - 3 - quinolinecarboxylic acid having a melting point of 258°–259° C.

EXAMPLE 36

A mixture containing 1 g. of ethyl 1,4-dihydro-1-methoxy-6,7-methylenedioxy-4-oxo-3 - quinolinecarboxylate and 15 cc. of 5% aqueous sodium hydroxide was refluxed for 1 hour and acidified by addition of concentrated hydrochloric acid. The white precipitate was filtered, washed with water and recrystalized from dimethylformamide to give 1,4-dihydro-1-methoxy-6,7 - methylenedioxy-4-oxo-3-quinolinecarboxylic acid.

What is claimed is:
1. A 1,4-dihydro-1-substituted - 4 - oxo - 3 - quinoline-carboxylic acid derivative of the Formula I,

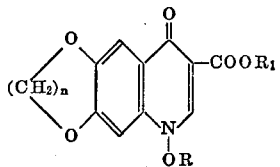

wherein R is a $C_1$–$C_{20}$ alkyl, a $C_3$–$C_6$ alkenyl wherein the double bond of said alkenyl group is in the $\beta$-position to said oxygen, a $C_3$–$C_6$ cycloalkyl, a $C_3$–$C_6$ cycloalkyl-$C_1$–$C_3$ alkyl, a hydroxy-$C_1$–$C_6$ alkyl, a $C_1$–$C_4$ alkoxy-$C_1$–$C_3$ alkyl, or a phenyl-$C_1$–$C_3$ alkyl; $R_1$ is a hydrogen atom or a $C_1$–$C_6$ alkyl and $n$ is 1.

2. The 1,4-dihydro-1-substituted-4-oxo - 3 - quinoline-carboxylic acid derivative according to claim 1, wherein R is a $C_1$–$C_4$ alkyl, 2-hydroxyethyl, cyclopropylmethyl, benzyl or allyl; $R_1$ is a hydrogen atom or a $C_1$–$C_4$ alkyl and $n$ is 1.

3. The 1,4-dihydro-1-substituted-4-oxo - 3 - quinolinecarboxylic acid derivative according to claim 1, wherein R is methyl; $R_1$ is a hydrogen atom or a $C_1$–$C_2$ alkyl.

4. 1,4-dihydro-1-methoxy-6,7-methylenedioxy - 4 - oxo-3-quinoline carboxylic acid.

5. Ethyl 1,4-dihydro-1-methoxy - 6,7 - methylenedioxy-4-oxo-3-quinolinecarboxylate.

References Cited
FOREIGN PATENTS

| 1,936,393 | 2/1970 | Germany | 260—287 |
| 1,814,187 | 7/1969 | Germany | 260—287 |
| 7010194 | 1/1971 | Netherlands | 260—287 |

DONALD G. DAUS, Primary Examiner

U.S. Cl. X.R.

260—283 S, 286 R; 424—258